United States Patent
Bajaj

(10) Patent No.: US 11,451,484 B2
(45) Date of Patent: *Sep. 20, 2022

(54) PATH SELECTION FOR AN APPLICATION BASED ON A PERFORMANCE SCORE IN A SOFTWARE-DEFINED NETWORK

(71) Applicant: Cisco Technology, Inc., San Jose, CA (US)

(72) Inventor: Sandeep Bajaj, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/902,510

(22) Filed: Jun. 16, 2020

(65) Prior Publication Data

US 2020/0382429 A1 Dec. 3, 2020

Related U.S. Application Data

(63) Continuation of application No. 15/665,296, filed on Jul. 31, 2017, now Pat. No. 10,700,982.

(51) Int. Cl.
*H04L 29/08* (2006.01)
*H04L 47/2425* (2022.01)
(Continued)

(52) U.S. Cl.
CPC ...... *H04L 47/2425* (2013.01); *H04L 41/5009* (2013.01); *H04L 41/5019* (2013.01);
(Continued)

(58) Field of Classification Search
CPC .................................................. H04L 65/1069
See application file for complete search history.

(56) References Cited

U.S. PATENT DOCUMENTS 9,356,871 B2 5/2016 Medved et al.
9,882,741 B2 1/2018 Nomi
(Continued)

FOREIGN PATENT DOCUMENTS

| CN | 105052083 A | 11/2015 |
|---|---|---|
| JP | 2014-230114 A | 12/2014 |
| JP | 2016-152567 A | 8/2016 |

OTHER PUBLICATIONS

International Search Report and Written Opinion from the International Searching Authority, dated Nov. 6, 2018, 9 pages, for the corresponding International Patent Application PCT/US2018/044120.

(Continued)

*Primary Examiner* — Adnan M Mirza
(74) *Attorney, Agent, or Firm* — Polsinelli

(57) ABSTRACT

A method may include receiving a data flow of an application directed to the destination in a software-defined network (SDN). The method may also include identifying a classification of the application. The method may additionally include identifying a set of performance thresholds associated with the classification of the application. The method may also include determining a current performance of the data flow of the application in the SDN. The method may also include generating a performance score for the application based on the set of performance thresholds and the current performance of the data flow of the application in the SDN. The method may further include causing the performance score for the application to be presented via an interface.

17 Claims, 4 Drawing Sheets

(51) Int. Cl.
*H04L 45/00* (2022.01)
*H04L 47/2441* (2022.01)
*H04L 41/5009* (2022.01)
*H04L 47/70* (2022.01)
*H04L 43/045* (2022.01)
*H04L 41/5022* (2022.01)
*H04L 41/5025* (2022.01)
*H04L 41/5019* (2022.01)
*H04L 43/16* (2022.01)
*H04L 45/12* (2022.01)
*H04L 43/08* (2022.01)
*H04L 45/302* (2022.01)
*H04L 43/10* (2022.01)

(52) U.S. Cl.
CPC ...... *H04L 41/5022* (2013.01); *H04L 41/5025* (2013.01); *H04L 43/045* (2013.01); *H04L 43/08* (2013.01); *H04L 43/16* (2013.01); *H04L 45/00* (2013.01); *H04L 45/123* (2013.01); *H04L 45/302* (2013.01); *H04L 45/38* (2013.01); *H04L 47/2441* (2013.01); *H04L 47/825* (2013.01); *H04L 43/10* (2013.01)

(56) References Cited

U.S. PATENT DOCUMENTS

| | | |
|---|---|---|
| 2014/0362686 A1 | 12/2014 | Jogalekar et al. |
| 2015/0156086 A1* | 6/2015 | Chesla .................. H04L 43/04 709/224 |
| 2015/0172201 A1* | 6/2015 | DeCusatis ............. H04L 47/12 370/235 |
| 2015/0195136 A1 | 7/2015 | Mermoud et al. |
| 2016/0359672 A1 | 2/2016 | Blair et al. |
| 2016/0234099 A1 | 8/2016 | Jiao |
| 2016/0254984 A1 | 9/2016 | Tekalp et al. |
| 2017/0214623 A1 | 7/2017 | Finkelstein |

OTHER PUBLICATIONS

Search Report dated Jun. 7, 2021 for corresponding Chinese Patent Application No. 201880049335.9.
English translation of Notice of Reasons for Rejection, dated May 14, 2021, 6 pages, for corresponding Japanese Patent Application No. 2020-503020.

* cited by examiner

PATH SELECTION FOR AN APPLICATION BASED ON A PERFORMANCE SCORE IN A SOFTWARE-DEFINED NETWORK

CROSS-REFERENCE TO RELATED APPLICATION

This application is a continuation of U.S. patent application Ser. No. 15/665,296 filed on Jul. 31, 2017, the contents of which is incorporated by reference in its entirety.

FIELD

The embodiments discussed in the present disclosure are related to improved path selection for an application in a software-defined network.

BACKGROUND

The use of networks is a useful tool in allowing communication between distinct computing devices. Some network traffic may be subject to agreements or requirements of an expected level of service for the network traffic. Such agreements or requirements are sometimes referred to as "service level agreements" (SLAs).

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method that may include receiving a data flow of an application directed to a destination in a software-defined network (SDN). The method may also include identifying a classification of the application. The method may additionally include identifying a set of performance thresholds associated with the classification of the application. The method may also include determining a current performance of the data flow of the application in the SDN. The method may also include generating a performance score for the application based on the set of performance thresholds and the current performance of the data flow of the application in the SDN. The method may further include causing the performance score for the application to be presented via an interface.

One or more embodiments of the present disclosure may additionally include systems and/or non-transitory computer readable media for facilitating the performance of such methods.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
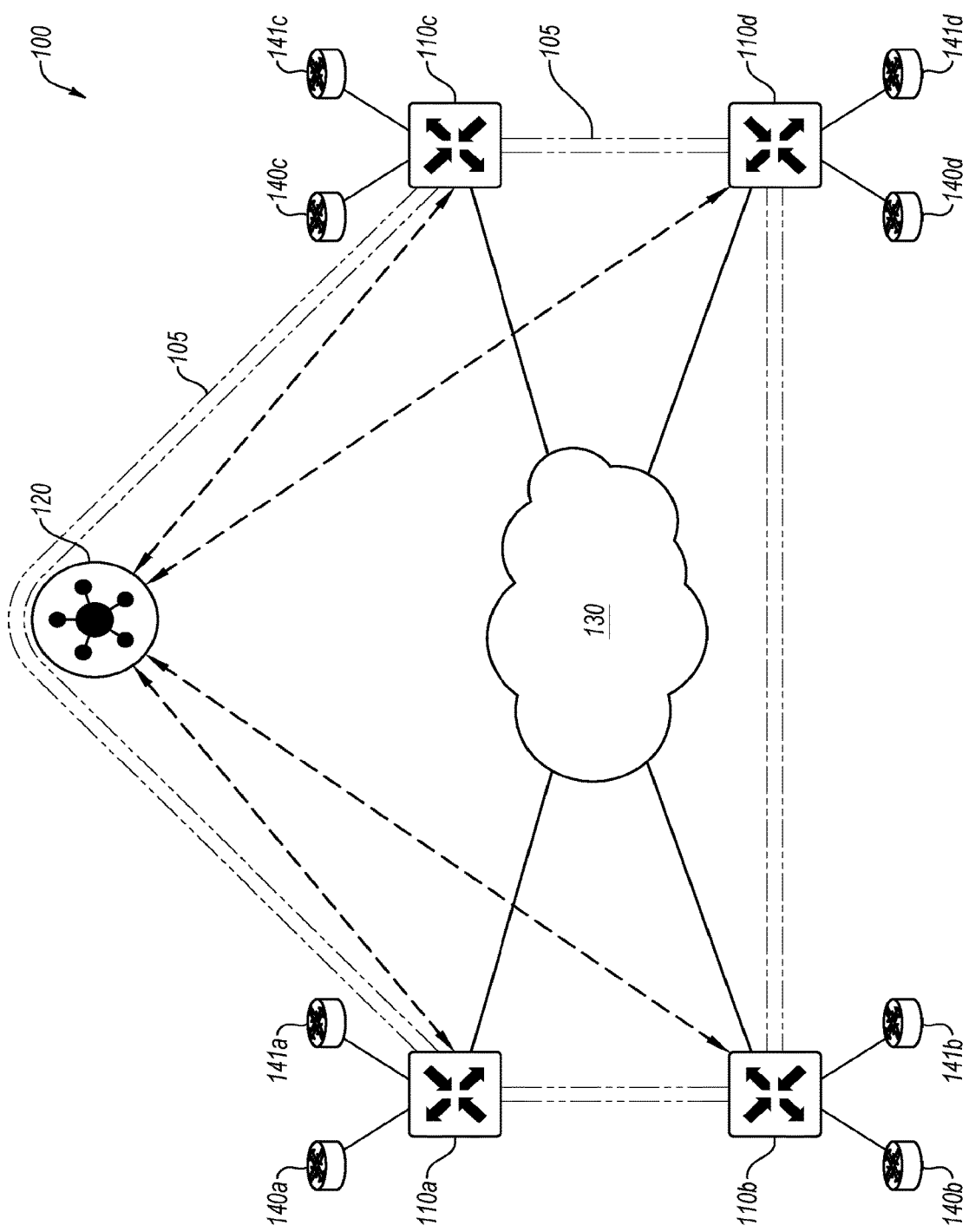
FIG. 1 illustrates an example system of network components implementing a software-defined network.

Some embodiments of the present disclosure relate to improvements to the operation of software-defined networks (SDN) and selecting data paths. In a SDN, a network control plane may be functionally separated from physical topology and a data plane, unlike conventional networking. Over the control plane, a control device may monitor the SDN and path characteristics of the data plane tunnels between devices (e.g., routers). In at least some embodiments, the SDN may include one or more virtualized components, such as a router that is run on a virtual machine, a hypervisor, or a cloud-based server. The present disclosure may provide a mechanism to determine a performance of an application as it relates to the SDN.

Some embodiments of the present disclosure relate to improvements to the characterization and selection of network paths for an application in a software-defined network. Techniques described herein may determine network metrics for loss, latency and jitter on a per tunnel basis. Systems described herein may provide visibility on which applications go over which tunnels. These systems may correlate the applications with their respective tunnel metrics. These systems may determine an application score indicative of the performance of the application on the respective tunnel. In at least some embodiments, the application score may be used to gauge application performance. In at least some embodiments, a new path may be selected for an application based on the application score. In at least some embodiments, a tunnel for an application may be changed based on an SLA. An SLA may include an agreed upon threshold level for one or more network performance metrics, such as bandwidth, availability, jitter, latency, loss, and/or others.

In some embodiments of the present disclosure, rather than only considering a most recent snapshot of network path performance, the network device may consider secondary factors, such as the historical performance of the various paths and/or a cost associated with a particular path. For example, the network device may consider a number of times that each of the potential paths dropped below an SLA for a given time period, and may select the path with the best performance. In some embodiments, a machine learning algorithm may be used to compare the historical performance of the various paths. Such a machine learning algorithm may include multiple factors (e.g., jitter, latency, loss, cost, carrier reputation, etc.) considered and continually refined over time. By using the historical performance and/or other factors, a selection may be made to find a path that is more likely to satisfy the SLA of a data flow, rather than simply selecting a path based on the most recent snapshot.

Embodiments of the present disclosure may provide improvements to computer networks and to the operation of computers themselves. For example, the performance of applications may be improved because a path more likely to satisfy performance requirements may be used for the application, allowing for increased response times and increased application performance. Additionally, network traffic may flow with increased performance by selecting paths that are more likely to satisfy SLAs of data flows. For example, using embodiments of the present disclosure may be more likely to place network traffic on more reliable paths, causing less retransmission of data. By providing for fewer retransmissions, valuable network resources such as bandwidth may be preserved, and increased response times may be provided. Additionally, because of the reduced number of retransmissions, the amount of traffic flowing through the internal network domain may be reduced, providing superior performance for the internal network domain. Another advantage in which the present disclosure may include cost savings as one factor in selecting a path may include considering costs associated with a particular path in the path selection process. The path selection techniques described herein may also be used for software-as-a-service ("SaaS") and/or cloud-based applications.

Embodiments of the present disclosure are explained with reference to the accompanying drawings.

FIG. 1 illustrates an example system 100 of network components implementing a software-defined network, in accordance with one or more embodiments of the present disclosure. In some embodiments, determining application performance and network path selection may be implemented in a software-defined network such as that illustrated by the system 100. The system 100 may include an internal network domain 105 and one or more external network domains. The system 100 may include one or more edge network devices 110 (such as the edge network devices 110a-110d), a control device 120, a communication network 130, and external network devices 140 and 141 (such as the external network devices 140a-140d and 141a-141d).

The system 100 may implement a software-defined network. A software-defined network may include a network that is managed by software rather than controlled by hardware. As such, a software-defined network may support multiple types of connections, such as the Internet, Multi-Protocol Label Switching (MPLS) connections, and/or cellular connections (such as Long Term Evolution (LTE), LTE Advanced, Worldwide Interoperability for Microwave Access (WiMAX), 4G, and/or others). Additionally, a software-defined network may support load balancing or load sharing between the various connections. Further, because of the distributed nature of a network, a software defined network may support virtual private networks (VPNs), firewalls, and other security services. In a software-defined network, for example, a control plane may be functionally separated from the physical topology. In some embodiments, a software-defined network may separate the control plane of the network (to be managed via software) from a data plane of the network (operating on the hardware of the network). As used herein, the term control plane may refer to communications and connections used in the control and administration of a network itself, rather than the transmission of data through the network, which may occur at the data plane. As used herein, the term data plane may refer to communications and connections used in the transmission and reception of data through the network. For example, the control plane may include administrative traffic directed to a network device within a network, while the data plane may include traffic that passes through network devices within the network.

In some embodiments, a software-defined network may be implemented as a software-defined wide area network (SD-WAN), local area network (LAN), metropolitan area network (MAN), among others. While one or more embodiments of the network path selection may be described in the context of an SD-WAN, such embodiments may also be implemented in any network.

In some embodiments, the control device 120 may be configured to manage the control plane of an internal network domain 105 by directing one or more aspects of the operation of the edge network devices 110. For example, the control device 120 may generate and/or distribute policies to one or more of the edge network devices 110. A policy may include a rule or set of rules bearing on the handling of network traffic, such as routing, priority, media, etc. In some embodiments, the policies may include SLAs for various data flows. For example, data flows associated with a video application may have an SLA that the data flow be routed along a path with latency below a first threshold, and data flows associated with a voice transmission application may have an SLA that the data flow be routed along a path with loss below a first threshold and jitter below a second threshold.

The internal network domain 105 may operate as a secured and controlled domain with specific functionality and/or protocols. In some embodiments, the edge network devices 110 may operate based on one or more policies created and/or propagated by the control device 120. In these and other embodiments, the edge network devices 110 may route data traffic within the internal network domain 105 based on the policies created and/or propagated by the control device 120.

In some embodiments, an edge network device (e.g., the edge network device 110a) may receive a data flow for an application that is to be routed to another edge network device (e.g., the edge network device 110d). The edge network device 110a may determine that the data flow for the application is subject to an SLA and that there are multiple potential paths for the edge network device 110a to route the traffic to the edge network device 110d. The edge network device 110a may identify a classification for the application. An application may be classified by a type of application. For example, applications may be classified based on the below table:

| Classification Name | Application Family |
| --- | --- |
| Real-time | Audio, Interactive Video, Telephony |
| Streaming | Streaming Video |
| Mission Critical Data | ERP, MS Office, Middleware |
| Transactional/Interactive | Terminal, Thin Client |
| Services | Routing, Encrypted, Authentication, Tunneling, WAP |
| Bulk Data | File Transfer, Mail, Database, Printer, Antivirus, Application Service, Network management |
| Scavenger | Peer to Peer, Gaming, Social Forums |
| Best Effort | All remaining unclassified traffic |

The classification for the application, for example, may be associated with a set of performance thresholds. The set of performance thresholds may include any number and type of metrics, such as network metrics and/or application metrics. For example, the set of performance thresholds may include loss, latency and jitter. Additional examples may include a mean opinion score ("MOS score") (e.g., for real time apps), TCP session timeouts/retransmits, etc. An example set of performance thresholds may be as in the below table. The values of the set of performance thresholds may be based on portions of the end-to-end metrics that can be tolerated between users and applications. The values in the below table may be representative of branch-edge to central-office-edge/cloud-edge metrics.

| Class Name | Latency | Loss Percent | Jitter | Latency/jitter sensitive | Loss sensitive |
|---|---|---|---|---|---|
| Real-time | 50 ms | 1 | 3 ms | Y | Y |
| Streaming | 75 ms | 3 | 7 ms | Y | Y |
| Mission Critical Data | 75 ms | 5 | 10 ms | Y | Y |
| Transactional/Interactive | 100 ms | 5 | 20 ms | N | Y |
| Services | 150ms | 3 | 50 ms | N | Y |
| Bulk Data | 250 ms | 10 | 50 ms | N | Y |
| Scavenger | — | — | — | N | N |
| Best Effort | 500 ms | 10 | — | N | N |

The edge network device 110a may determine current performance of an application, such as in a per-tunnel basis. The edge network device 110a may compare the current performance of the application with the set of performance thresholds. Based at least in part on this comparison, the edge network device 110a may generate a performance score for the application. When the performance score for the application is below a score threshold, the edge network device 110a may identify and/or select a different path and/or tunnel for the application to increase the performance score for the application.

In an example, for a given application, the edge network device 110a may generate the performance score using the following techniques. First, the edge network device 110a may calculate an individual latency, loss and jitter score, which may be referred to as "IM," using the following expression:

If $(AM<=DM)$ $IM=10$ else $IM=DM/AM*10$, where AM is the current performance and where DM is the set of performance thresholds. The edge network device 110a may then generate the performance score using the individual latency, loss and jitter score, such as using the following expressions:

performance score=sum($IM[i]$)/3 if the class is both latency and loss sensitive OR if the class is neither loss nor latency sensitive;

else performance score=(($IM$[latency]+$IM$[jitter])*0.5+$IM$[loss])/2 if class is loss sensitive but not latency sensitive The edge network device 110a may also consider secondary factors, such as the historical performance of the various paths in determining which path is to be used for the data flow. One example aspect of historical performance may include a number of instances during a given duration of time that the historical performance data dropped below the threshold. Such a determination may count the act of going from above the threshold to below the threshold, although other mechanisms for such a determination may be used. Another example aspect of historical performance may include a duration of time that the historical performance data was below the threshold for a given span of time. Another example aspect of historical performance may include considerations of the carrier of the path. Additionally, other reputation, performance, opinion, etc. data of the first carrier may be included in the path selection.

Another example aspect that may be included in the path selection may be the cost associated with using a certain path. For example, if first network is more expensive than the second network to carry data, the path selection decision may favor the less expensive paths through the second network.

In some embodiments, determining a path based on the historical performance may include the use of analytics such as a machine learning algorithm or other analytics in determining the path. In some embodiments, the analytics may yield a given score for a path based on the analyzed historical performance and may represent an aggregate historical performance for a path. For example, the first network device 210a may look at the score when performing path selection for the data flow rather than performing a historical data analysis each time a data flow is received. In some embodiments, the score may continually be refined over time.

In some embodiments, the analytics to determine the aggregate historical performance may include a machine learning algorithm. One example of a machine learning algorithm consistent with the present disclosure may include a random forest algorithm where the variables in the algorithm may include one or more of the aspects of the historical performance, such as how many times the historical performance data dropped below the threshold, how long the historical performance data dropped below the threshold, and/or the reputation of the carrier of the path. In these and other embodiments, multiple aspects of the historical performance may be included in generating the aggregate historical performance, or in performing the path selection.

For example, for a random forest algorithm, multiple decision trees to characterize performance of a given path as a score may be generated. The decision trees may include a set of variables being considered (e.g., duration of time below threshold, number of times crossing threshold, cost, carrier reputation, etc.) and an expected score for the given combination of variables. The decision trees may be generated based on random groupings of such known combinations of variables and their corresponding scores. The multiple decision trees may be used to analyze historical performance data of paths. For example, historical performance data for a path to be analyzed may be passed through the decision trees to generate a score for each of the decision trees. A common or average score between the decision trees may be used to provide a score for the path. In some embodiments, the historical performance data may be analyzed using the decision trees when a data flow is received, when a probe measuring network performance returns, periodically, or on any other bases. In some embodiments, the score may be stored such that when a network device performs a path selection decision, the score may be already generated such that the network device obtains the score and compares it to the scores of other potential paths in performing the path selection. While a random forest algorithm is described, any other machine learning, analytics, or other analysis may be performed to compare the historical performance of the paths to select a path for a data flow subject to an SLA.

In some embodiments, the aggregate historical performance may include a weighting factor for one or more data points of the historical performance. For example, the more recent historical performance data points may be weighted more heavily than more distant in the past data points. In these and other embodiments, the weighting factor may include a half-life or other decay function such that certain data points become less and less impactful, and/or eventually have no impact on the aggregate historical performance. In some embodiments, a cutoff point may be used in deciding which data points of the historical performance are used in determining the aggregate historical performance. For example, such a cutoff point may focus the aggregate historical performance on a certain number of recent data points of the historical performance, or a certain duration of time of data points that may be used to contribute to the aggregate historical performance.

In some embodiments, the aggregate historical performance may be based on near term historical performance (e.g., within a certain time period such as within the last week, last two weeks, or last month), long term historical performance (e.g., older than within a certain time period, such as older than a week, older than two weeks, or more than a month old), or a combination of both.

In some embodiments, the control device 120 may form a control plane connection with each of the edge network devices 110. The control plane connection may facilitate the exchange of management data between the edge network devices 110 and the control device 120 for management and control of the internal network domain 105. The control plane connection may operate as a tunnel through the communication network 130, such as a Datagram Transport Layer Security (DTLS) tunnel. In some embodiments, data transmitted over the control plane connection may facilitate the control device 120 determining topology of the communication network 130. For example, the control device 120 may communicate with the edge network devices 110 to determine what physical connections exist between and among the edge network devices 110 in the communication network 130. Additionally or alternatively, data transmitted over the control plane connection may facilitate the control device 120 determining optimal or desired paths across the communication network 130 between and among the edge network devices 110. Such communications may facilitate path selection. Additionally or alternatively, the control device 120 may communicate route information to the edge network devices 110 over the control plane connection. In these and other embodiments, the control plane connection may include a permanent connection between the control device 120 and the edge network devices 110 such that if the connection between the control device 120 and a given edge network device 110 is broken, the edge network device 110 may be unable or otherwise disallowed from communicating over the internal network domain 105.

In some embodiments, the control device 120 may maintain a central route table that stores route information within the internal network domain 105. For example, the control device 120 may communicate with various edge network devices 110 to determine the physical connections available to the edge network devices 110 through the communication network 130. In some embodiments, the edge network devices 110 may include one or more physical connections to each other. In these and other embodiments, the control device 120 may generate and/or update one or more policies in conjunction with the central route table to determine paths through the internal network domain 105, and may communicate those paths to the edge network devices 110. In at least one embodiment, the control device 120 may provide policies and other categorical rules related to data flows to the edge network devices 110 rather than being involved with every individual flow through the internal network domain 105.

In these and other embodiments, the edge network devices 110 may not have stored the topology and/or route paths of the entire system 100. Each of the edge network devices 110 may not need to query each other individually to determine reachability. Instead, the control device 120 may provide such information to the edge network devices 110. Additionally or alternatively, a subset of the reachability and/or infrastructure information may be provided to the edge network devices 110, for example, based on one or more policies of the control device 120.

In network path selection decisions, if the network traffic is a data flow subject to an SLA, the edge network device 110 performing the path selection decision may consider the historical performance of the various potential paths over the connections through the internal network domain 105.

In addition to generating policies to guide the edge network devices 110 in making path selection decisions, the control device 120 may generate other policies that are to be followed by the edge network devices 110. In some embodiments, the control device 120 may generate policies to cause certain network traffic flows within the internal network domain 105 to be routed over certain types of connections (e.g., LTE, MPLS) and/or through certain edge network devices 110. For example, the control device 120 may check the central route table and determine that a direct connection exists between the edge network device 110a and the edge network device 110c. Rather than allowing data to be routed directly between the edge network device 110a and the edge network device 110c, the control device 120 may generate a policy to instead cause the data to be routed through the edge network device 110d. For example, the data may be routed through the edge network device 110d for various reasons, such as because the edge network device 110d may include a firewall, data filter, security feature, data loss prevention (DLP) feature, export control, or government compliance feature, among others. As another example, the control device 120 may generate a policy to cause one or more of the edge network devices 110 to route traffic through an edge network device 110 associated with a data center, for example, because the data center includes a firewall, data filter, etc. Using such an approach, the flow of traffic within the internal network domain 105 may be readily controlled and guided based on policies and traffic routes propagated by the control device 120 to the edge network devices 110.

The edge network devices 110 may operate at a boundary of the internal network domain 105. The edge network devices 110 may include one or more physical and/or logical connections that may operate within the internal network domain 105. Such connections may be illustrated as part of the communication network 130. Additionally or alternatively, the edge network devices 110 may include one or more physical and/or logical connections operating outside of the internal network domain 105. For example, the edge network devices 110 may be connected to the external network device(s) 140 and/or 141.

In some embodiments, the edge network devices 110 may operate to route traffic from associated external network devices 140 and 141 into the internal network domain 105. Additionally or alternatively, the edge network devices 110 may operate to route traffic from the internal network domain 105 to the associated external network devices 140 and 141. In some embodiments, the edge network devices 110 may communicate with associated external network devices 140 and 141 using typical communication protocols, such as Open Shortest Path First (OSPF), Border Gateway Protocol (BGP), Virtual Router Redundancy Protocol (VRRP), and Bi-directional Forwarding Detection (BFD), among others. Additionally or alternatively, the edge network devices 110 may support other network functionalities such as Virtual Local Area Network (VLAN) tagging, Quality of Service (QoS) monitoring, Internet Protocol (IP)

forwarding, Internet Protocol Security (IPsec), Access Control Lists (ACL), among others.

For example, with QoS monitoring, the edge network devices 110 may provide for one or more network performance metrics that may be monitored, such as jitter, bandwidth, error rate, bit rate, throughput, and/or others. In some embodiments, the edge network devices 110 may monitor the network performance metrics by periodically transmitting a message to measure the one or more network performance metrics. Such messages may take any format, such as an internet control message protocol (ICMP) echo probe, a jitter probe, a transmission control protocol (TCP) probe, a user datagram protocol (UDP) echo probe, etc. In these and other embodiments, the monitoring messages may be sent at any frequency, such as every thirty seconds, every sixty seconds, every two minutes, every five minutes, every ten minutes, etc. Additionally or alternatively, the monitoring probes may be sent in response to one or more events. In some embodiments, the frequency of such messages may be sent at a decreased frequency when no traffic is flowing and/or may be sent at an increased frequency when traffic is flowing along a path.

In some embodiments, the edge network devices 110 may locally maintain one or more local route tables. In some embodiments, the edge network devices 110 may adjust or modify the local route tables based on one or more policies sent from the control device 120. For example, one or more entries may be removed, discarded, or otherwise not added to the local route tables by the edge network devices 110 based on the one or more policies. In some embodiments, the edge network devices 110 may include logic to update, modify, and/or generate the local route tables based on traffic handled by the edge network devices 110. The one or more local route tables may be automatically populated by the edge network devices 110 based on direct interface routes, static routes, and/or dynamic routes learned using one or more network protocols such as BGP and/or OSPF. In some embodiments, routing decisions for data outside of the internal network domain 105 may be performed by a particular edge network device 110 without specific direction, input, or control from the control device 120. For example, the particular edge network device 110 may select a path based on the one or more policies that the particular edge network device 110 has received from the control device 120, with reference to the local route table of the particular edge network device 110, and/or based on historical performance of the paths.

In some embodiments, one or more of the edge network devices 110 and/or the control device 120 may be implemented as one or more virtual machines operating on one or more physical computing devices. Additionally or alternatively, the edge network devices 110 and/or the control device 120 may each include an individual stand-alone computing device.

Modifications, additions, or omissions may be made to FIG. 1 without departing from the scope of the present disclosure. For example, while illustrated as including four edge network devices 110 and one control device 120, the system 100 may include any number of edge network devices 110 and control devices 120, such as thousands or tens of thousands of edge network devices 110 and more than five control devices 120. As another example, as illustrated as a single communication network 130, the communication network 130 may include multiple types of communication connections.

Figure 2:
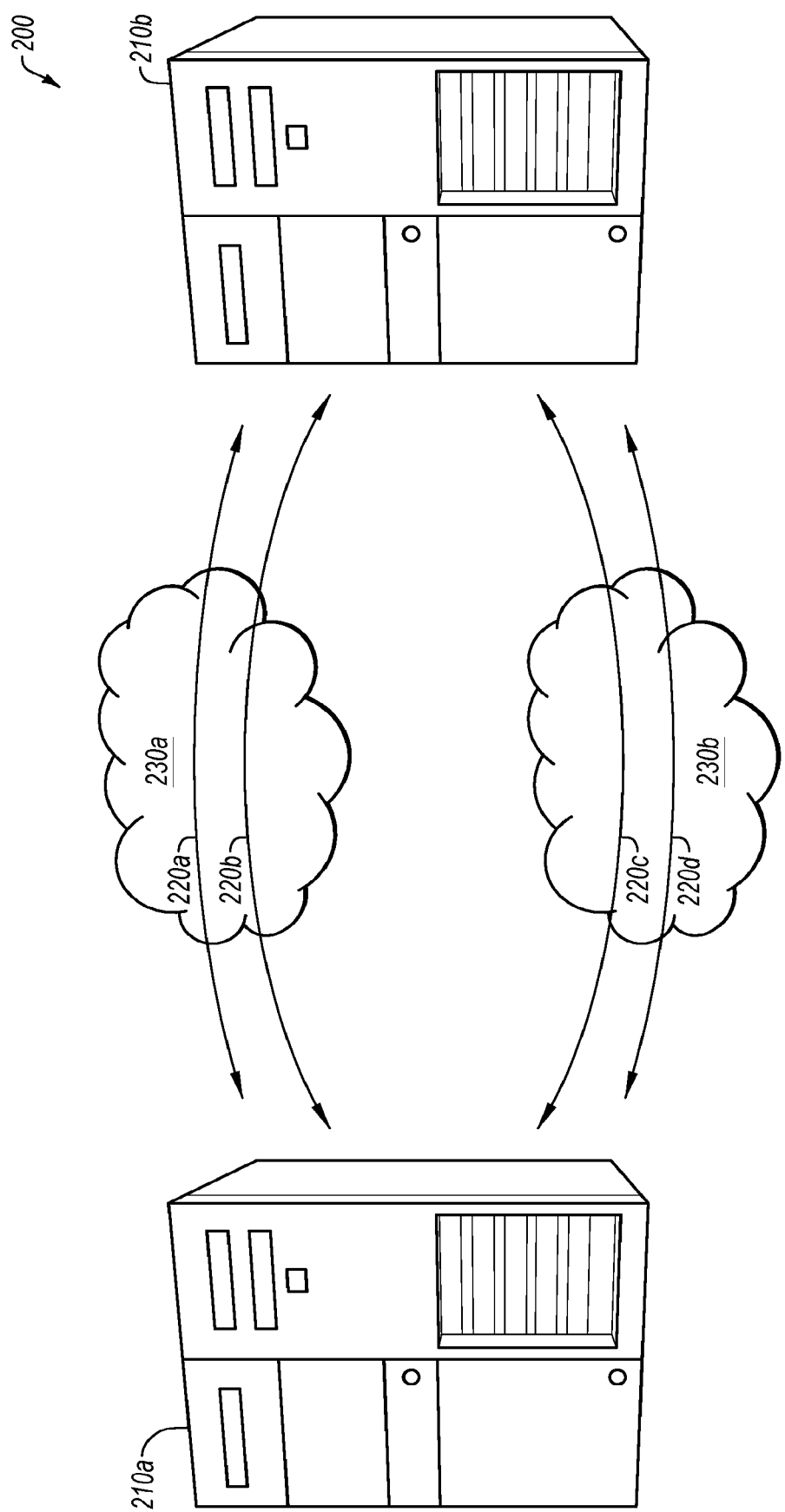
FIG. 2 illustrates an example system with multiple paths between network devices.

FIG. 2 illustrates an example system 200 with multiple paths between network devices 210, in accordance with one or more embodiments of the present disclosure. The network devices 210 (such as a first network devices 210a and a second network device 210b) may be configured to route data flows for an application through one or more networks 230 (such as a first network 230a and a second network 230b). There may be multiple paths 220 between the first and second network devices 210a and 210b (such as a first path 220a and second path 220b through the first network 230a, and a third path 220c and a fourth path 220d through the second network 230b).

The network devices 210a-b may include any device or system configured to receive a data flow to be routed through one or more of the networks 230a-b, and route the data flow through one or more of the networks 230a-b. For example, the network devices 210a-b may be implemented as an edge network device 110 of FIG. 1. In some embodiments, the network devices 210a-b may receive the data flow from one or more electronic devices (not illustrated).

In some embodiments, the network devices 210a-b may monitor the network performance of the paths 220a-d through the networks 230a-b. For example, the first network device 210a may periodically send probes or other messages through the networks 230a-b to measure the network performance of various metrics (such as QoS metrics) for the various paths. Additionally or alternatively, the network devices 210a-b may store data regarding the performance of the paths 220a-d. Such stored network performance may be referred to as historical performance data. The historical performance data may be maintained locally, and/or may be communicated to a central device (such as the control device 120 of FIG. 1).

Figure 3:
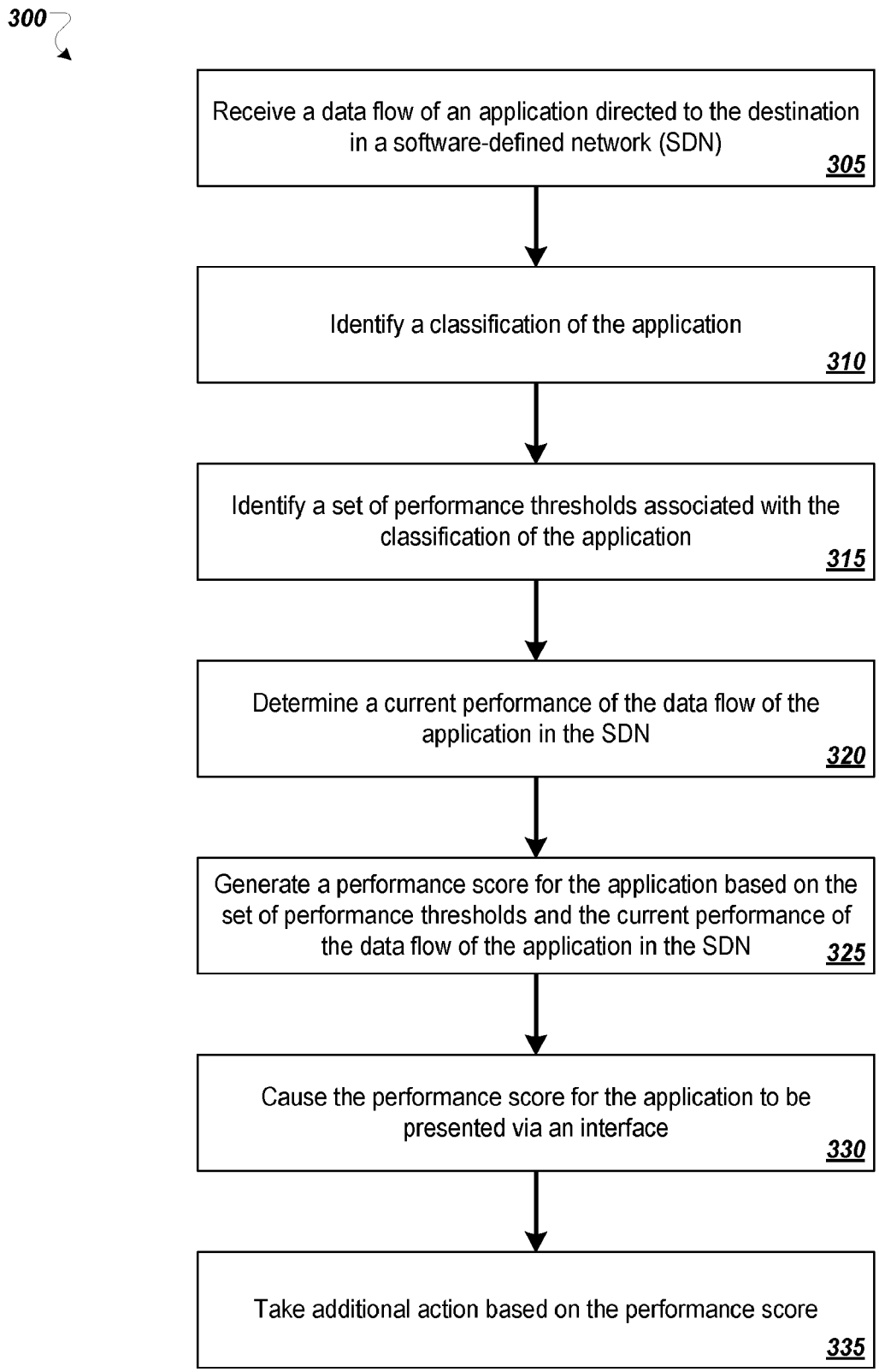
FIG. 3 illustrates a flowchart of an example method to generate a performance score for an application in a network.

After receiving a data flow for an application at the first network device 210a directed to the second network device 210b, the first network device 210a may determine which of the paths 220a-d to use to route the data flow to the second network device 210b. For example, if the data flow for the application is subject to an SLA, the first network device 210a may determine whether any of the paths 220a-d comply with the SLA. For example, the first network device 210a may observe, look-up, request, or otherwise obtain the most recent historical performance data associated with the SLA for the various paths 220a-d. If only one path satisfied the network performance metrics associated with the SLA, the first network device 210a may route the data flow along that path. However, if multiple paths satisfied the SLA network performance metrics, the historical performance of those paths (or all possible paths) may be considered. Additionally or alternatively, if none of the paths satisfied the SLA performance metrics, the historical performance of all of the paths 220a-d may be considered. Any of a variety of aspects of the historical performance of the paths 220a-d may be used to determine which path is to carry the data flow. FIG. 3 may illustrate various examples of historical performance data and may be used to articulate examples of such aspects of the historical performance.

Modifications, additions, or omissions may be made to FIG. 2 without departing from the scope of the present disclosure. For example, while illustrated as including two network devices 210a-b, the system 200 may include any number of network devices. As another example, as illustrated as four paths 220a-d, any number of paths over any number of networks may be included.

FIG. 3 illustrates a flowchart of an example method 300 to generate a performance score for an application in a network. Changes may be made to the network based on the performance score for the application. The method may be performed by processing logic that may include hardware (circuitry, dedicated logic, etc.), software (such as is run on a general purpose computer system or a dedicated machine), or a combination of both, which processing logic may be included in the any of the network devices (e.g., the edge network devices 110 or 210 of FIGS. 1-2), or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method 300 may begin at block 305, where the processing logic may receive a data flow of an application directed to a destination in a software-defined network (SDN).

At block 310, the processing logic may identify a classification of the application, such as by looking up a table of application classifications. The table of application classifications may keyed with the application or an identifier of the application. The classification of the application may include the classifications described with respect to FIG. 1.

At block 315, the processing logic may identify a set of performance thresholds associated with the classification of the application. The performance thresholds may include thresholds for latency, loss, jitter, latency/jitter sensitivity, loss sensitivity, among others. Example performance thresholds are further described in conjunction with FIG. 1.

At block 320, the processing logic may determine a current performance of the data flow of the application in the SDN. The processing logic may identify a current performance of any of the components of a path, such as a tunnel, link, edge device, etc.

At block 325, the processing logic may generate a performance score for the application based on the set of performance thresholds and the current performance of the data flow of the application in the SDN. For example, the performance score for the application may be generated based on a duration of time that a tunnel remains above a SLA threshold. In these and other embodiments, tunnels that remain over the threshold for shorter periods of time may be chosen over others that have remained over SLA thresholds for longer periods of time. In another example, the performance score for the application may be generated based on a number of fluctuations that may have happened over an SLA threshold. In a further example, the performance score for the application may be generated based on carrier information. In yet another example, the performance score for the application may be generated based on a cost of carrying traffic over that link. In at least some embodiments, the processing logic may periodically update the performance score for the application based on the above metrics among other metrics. At block 330, the processing logic may cause the performance score for the application to be presented via an interface, such as a graphical user interface (GUI).

At block 335, the processing logic may take additional action based on the performance score. In at least some embodiments, the processing logic may identify a first tunnel associated with the application through which the data flow is configured to travel and select a second tunnel based on the performance score for the application.

In at least some embodiments, when selecting the second tunnel based on the performance score for the application, the processing logic may determine that the data flow across the second tunnel is more likely to satisfy the set of performance thresholds than the data flow across the first tunnel.

In at least some embodiments, the processing logic may monitor one or more network performance metrics for the first tunnel and the second tunnel and store historical performance data of the network performance metrics of the first tunnel and the second tunnel. For example, the processing logic may observe or otherwise perform one or more calculations or analyses on messages in the tunnel and/or path and may monitor the network performance metrics of the paths and/or tunnels.

The second tunnel may be selected at least in part based on the historical performance data of the network performance metrics of the first tunnel and the second tunnel. In at least some embodiments, the second tunnel may be selected based on the second tunnel historically being above the set of performance thresholds for a longer duration than the first tunnel historically being above the set of performance thresholds. In at least some embodiments, the set of performance thresholds includes a latency threshold, a loss percentage threshold and a jitter threshold. In at least some embodiments, the set of performance thresholds includes a latency/jitter sensitivity threshold and a loss percentage sensitivity threshold.

In at least some embodiments, a message may be periodically sent along one or more paths to a destination to determine network performance metrics for paths and/or tunnels. For example, a network device (such as the first network device 210*a* of FIG. 2) may periodically send a probe to determine jitter, latency, loss, etc. of various paths (such as the paths 220*a-d*) through the network (such as the networks 230*a-b* of FIG. 2) to other network devices (such as the second network device 210*b* of FIG. 2).

One skilled in the art will appreciate that, for these processes, operations, and methods, the functions and/or operations performed may be implemented in differing order. Further, the outlined functions and operations are only provided as examples, and some of the functions and operations may be optional, combined into fewer functions and operations, or expanded into additional functions and operations without detracting from the essence of the disclosed embodiments. For example, any number of tunnels may be considered, analyzed and selected. In at least some embodiments, selection criteria may be used to rank any number of tunnels.

Figure 4:
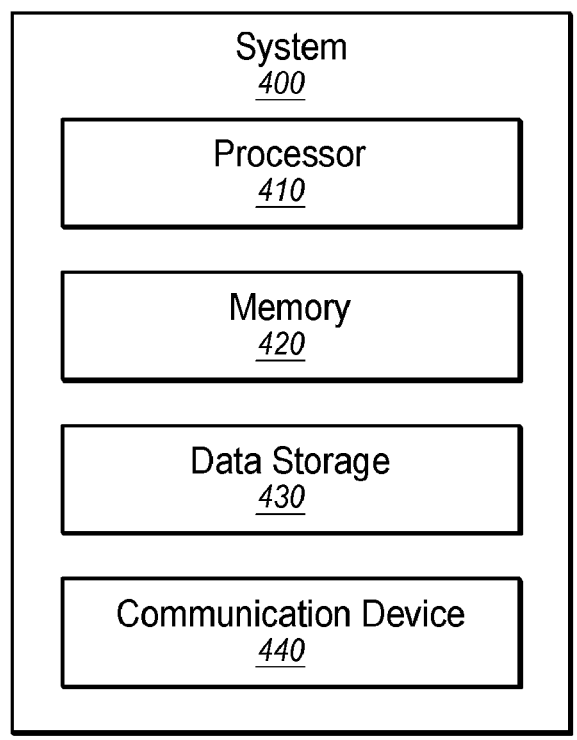
FIG. 4 illustrates an example computing system.

FIG. 4 illustrates an example computing system 400, according to at least one embodiment described in the present disclosure. The system 400 may include any suitable system, apparatus, or device configured to select a path over which to route a data flow, or facilitate such path selection. The computing system 400 may include a processor 410, a memory 420, a data storage 430, and a communication unit 440, which all may be communicatively coupled. In some embodiments, any of the network devices (e.g., the edge network devices 110 of FIG. 1 or the network devices 210 of FIG. 2), or other computing devices of the present disclosure may be implemented as the computing system 400. Additionally or alternatively, one or more of the network devices or other computing devices may be implemented as virtualized machines operating on a physical computing system such as the computing system 400.

Generally, the processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 4, it is understood that the processor 410 may include any number of processors distributed across any number of network or physical locations that are configured to perform individually or collectively any number of operations described in the present disclosure. In some embodiments, the processor 410 may interpret and/or execute program instructions and/or process data stored in the memory 420, the data storage 430, or the memory 420 and the data storage 430. In some embodiments, the processor 410 may fetch program instructions from the data storage 430 and load the program instructions into the memory 420.

After the program instructions are loaded into the memory 420, the processor 410 may execute the program instructions, such as instructions to perform the method 300 of FIG. 3. For example, the processor 410 may generate a performance score for an application and make take some action in the network based on the performance score.

The memory 420 and the data storage 430 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 410. In some embodiments, the computing system 400 may or may not include either of the memory 420 and the data storage 430.

By way of example, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 410 to perform a certain operation or group of operations.

The communication unit 440 may include any component, device, system, or combination thereof that is configured to transmit or receive information over a network, such as an MPLS connection, the Internet, a cellular network (e.g., an LTE network), etc. In some embodiments, the communication unit 440 may communicate with other devices at other locations, the same location, or even other components within the same system. For example, the communication unit 440 may include a modem, a network card (wireless or wired), an optical communication device, an infrared communication device, a wireless communication device (such as an antenna), a chipset (such as a Bluetooth device, an 802.6 device (e.g., Metropolitan Area Network (MAN)), a WiFi device, a WiMax device, cellular communication facilities, or others), and/or the like, or any combinations thereof. The communication unit 440 may permit data to be exchanged with a network and/or any other devices or systems described in the present disclosure. For example, the communication unit 440 may allow the system 400 to communicate with other systems, such as network devices, control devices, and/or other networks.

Modifications, additions, or omissions may be made to the system 400 without departing from the scope of the present disclosure. For example, the data storage 430 may include multiple different storage mediums located in multiple locations and accessed by the processor 410 through a network.

As indicated above, the embodiments described in the present disclosure may include the use of a special purpose or general purpose computer (e.g., the processor 410 of FIG. 4) including various computer hardware or software modules, as discussed in greater detail below. Further, as indicated above, embodiments described in the present disclosure may be implemented using computer-readable media (e.g., the memory 420 or data storage 430 of FIG. 4) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
   receiving a data flow;
   identifying a classification of the data flow that is specific to a type of application associated with data of the data flow based on a classification table indicative of the application;
   identifying a service level agreement specific to the classification based on the type of application;
   matching the classification to a set of performance thresholds based on the service level agreement, wherein the set of performance thresholds includes a loss of percentage sensitivity threshold;
   determining a current performance of the data flow;
   generating a performance score based on the set of performance thresholds and the current performance; and
   taking an action based on the performance score.

2. The method of claim 1, further comprising:
   identifying a first tunnel through which the data flow is configured to flow; and
   selecting a second tunnel based on the performance score.

3. The method of claim 2, wherein the selecting of the second tunnel includes determining the data flow across the second tunnel is more likely to satisfy the set of performance thresholds than the data flow across the first tunnel.

4. The method of claim 2, further comprising:
   monitoring one or more network performance metrics for the first tunnel and the second tunnel; and
   storing historical performance data of the one or more network performance metrics of the first tunnel and the second tunnel, wherein the second tunnel is selected at least in part based on the historical performance data of the network performance metrics of the first tunnel and the second tunnel.

5. The method of claim 3, wherein the second tunnel is selected based on the second tunnel historically being greater than the set of performance thresholds for a longer duration than the first tunnel historically being greater than the set of performance thresholds.

6. The method of claim 1, wherein the action is causing the performance score to be presented via an interface.

7. A system comprising:
   one or more processors; and
   a memory storing instructions, which when executed by the one or more processors causes the one or more processors to:
   receive a data flow;
   identify a classification of the data flow that is specific to a type of application associated with data of the data flow based on a classification table indicative of the application;
   identify a service level agreement specific to the classification based on the type of application;
   match the classification to a set of performance thresholds based on the service level agreement, wherein the set of performance thresholds includes a loss of percentage sensitivity threshold;
   determine a current performance of the data flow;
   generate a performance score based on the set of performance thresholds and the current performance; and
   take an action based on the performance score.

8. The system of claim 7, further comprising instructions which when executed by the one or more processors, cause the one or more processors to:
identify a first tunnel through which the data flow is configured to flow; and
select a second tunnel based on the performance score.

9. The system of claim 8, further comprising instructions which when executed by the one or more processors, cause the one or more processors to:
determine the data flow across the second tunnel is more likely to satisfy the set of performance thresholds than the data flow across the first tunnel.

10. The system of claim 8, further comprising instructions which when executed by the one or more processors, cause the one or more processors to:
monitor one or more network performance metrics for the first tunnel and the second tunnel; and
store historical performance data of the one or more network performance metrics of the first tunnel and the second tunnel, wherein the second tunnel is selected at least in part based on the historical performance data of the network performance metrics of the first tunnel and the second tunnel.

11. The system of claim 9, wherein the second tunnel is selected based on the second tunnel historically being greater than the set of performance thresholds for a longer duration than the first tunnel historically being greater than the set of performance thresholds.

12. The system of claim 9, wherein the action is presenting the performance score via an interface.

13. A non-transitory computer-readable medium storing computer-readable instructions stored which when executed by one or more processors, causes the one or more processor to:
receive a data flow;
identify a classification of the data flow that is specific to a type of application associated with data of the data flow based on a classification table indicative of the application;
identifying a service level agreement specific to the classification based on the type of application;
match the classification to a set of performance thresholds based on the service level agreement, wherein the set of performance thresholds includes a loss of percentage sensitivity threshold;
determine a current performance of the data flow;
generate a performance score based on the set of performance thresholds and the current performance; and
take an action based on the performance score.

14. The non-transitory computer-readable medium of claim 13, further comprising instructions which when executed by the one or more processors, cause the one or more processors to:
identify a first tunnel through which the data flow is configured to flow; and
select a second tunnel based on the performance score.

15. The non-transitory computer-readable medium of claim 14, further comprising instructions which when executed by the one or more processors, cause the one or more processors to:
determine the data flow across the second tunnel is more likely to satisfy the set of performance thresholds than the data flow across the first tunnel.

16. The non-transitory computer-readable medium of claim 14, further comprising instructions which when executed by the one or more processors, cause the one or more processors to:
monitor one or more network performance metrics for the first tunnel and the second tunnel; and
store historical performance data of the one or more network performance metrics of the first tunnel and the second tunnel, wherein the second tunnel is selected at least in part based on the historical performance data of the network performance metrics of the first tunnel and the second tunnel.

17. The non-transitory computer-readable medium of claim 15, wherein the second tunnel is selected based on the second tunnel historically being greater than the set of performance thresholds for a longer duration than the first tunnel historically being greater than the set of performance thresholds.

* * * * *